United States Patent [19]

Logan et al.

[11] 3,912,766

[45] Oct. 14, 1975

[54] REGENERATION OF DEGRADED QUINONES FOR THE PRODUCTION OF HYDROGEN PEROXIDE

[75] Inventors: William Reid Logan, Kingsley; Alan Rippon, Liverpool, both of England

[73] Assignee: Laporte Industries Limited, London, England

[22] Filed: Dec. 11, 1972

[21] Appl. No.: 313,624

[30] Foreign Application Priority Data

Dec. 20, 1971 United Kingdom............. 059029/71

[52] U.S. Cl............... 260/369; 260/348 L; 423/588
[51] Int. Cl.²................. C07D 49/68; C01B 15/025
[58] Field of Search........ 260/396, 369 US, 369 FR; 423/588

[56] References Cited

UNITED STATES PATENTS

| | | | |
|---|---|---|---|
| 2,739,875 | 3/1956 | Sprauer et al. | 260/369 |
| 3,330,625 | 7/1967 | Baker et al. | 260/369 |

FOREIGN PATENTS OR APPLICATIONS

| | | | |
|---|---|---|---|
| 838,939 | 6/1960 | United Kingdom | 260/369 |
| 2,012,988 | 9/1970 | Germany | 260/369 |

*Primary Examiner*—Anton H. Sutto
*Assistant Examiner*—Michael Shippen
*Attorney, Agent, or Firm*—Larson, Taylor and Hinds

[57] ABSTRACT

Continuous operation of a cyclic process for the production of hydrogen peroxide, each cyclic involving catalytic hydrogenation followed by oxidation of a useful quinone compound and extraction of hydrogen peroxide, results in the formation of quinone degradation products, of which one known class is quinone epoxides.

According to the present invention, useful quinone compounds may be regenerated from degraded working solutions, particularly solutions containing both quinone epoxides and other degradation products by subjecting the solution to a combination of at least two different regeneration treatments such as or treating the working solution in both the reduced and oxidised states.

3 Claims, No Drawings

REGENERATION OF DEGRADED QUINONES FOR THE PRODUCTION OF HYDROGEN PEROXIDE

The present invention relates to hydrogen peroxide, and particularly to a process for regeneration of useful quinone compounds from degraded quinone products formed during continuous working of a cyclic process for the production of hydrogen peroxide.

Reference herein to a cyclic process for the production of hydrogen peroxide is to a process in which a working solution comprising one or more useful quinone compounds in a solvent system, is subjected to a cycle of process steps including, in this order, reduction by catalytic hydrogenation of the quinone compounds to produce quinol compounds, oxidation of the quinol compounds to produce quinone compounds and hydrogen peroxide, and extraction of the hydrogen peroxide.

The useful quinone compounds which may be used in such a cyclic process are, for example, anthraquinone compounds and naphthoquinone compounds, such as 2-ethyl anthraquinone, or 2-amyl anthraquinone, or 2-t-butyl anthraquinone, or 2-methyl 3 n-butyl naphthoquinone or 2,3-diethyl naphthoquinone, or ring-hydrogenated derivatives of such aforementioned anthraquinone compounds, which derivatives form during prolonged operation of the cyclic process, for example 2-ethyl tetrahydroanthraquinone.

The solvent system used often comprises a mixture of solvents, namely a solvent for quinone compounds, and a solvent for quinol compounds. Solvents for quinone compounds are usually aromatic hydrocarbons or mixtures of such hydrocarbons with high boiling aliphatic hydrocarbons. We prefer to use a mixture of hydrocarbons obtained as a petroleum cut having a boiling range of from 145°C to 210°C which is available commercially from I.C.I. (England) and sold under the Trade Name "AROMASOL." Alternative solvents include aryl compounds such as xylene or alkylaryl compounds such as dimethyl naphthalene or diphenyl methane.

Solvents for quinol compounds are usually esters, aliphatic alcohols or ketones. We prefer to use esters of a cyclohexyl alcohol with a short chain aliphatic acid, particularly methyl cyclohexyl acetate available commercially from Laporte Industries Limited (England) and sold under the Trade Name "SEXTATE." Alternatively the solvents may be selected from phosphate esters, alcohols such as octanol or di-isobutyl carbinol, ketones such as acetophenone or di-isobutyl ketone, and ethers.

Continuous working of the cyclic process for producing hydrogen peroxide leads to formation of a degraded working solution containing a complex mixture of degradation products, which can take no part in the production of hydrogen peroxide. Some of these degradation products are derived from the useful quinone content of the working solution. A class of such degradation products has been isolated and can be described as quinone epoxides. The principal epoxide resulting from degradation of 2-ethyl anthraquinone in the cyclic process for the production of hydrogen peroxide is 2-ethyl tetrohydroanthraquinone epoxide and has the formula

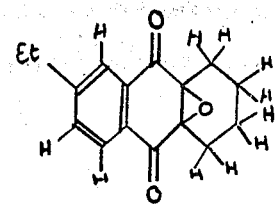

Hitherto processes have been disclosed for regenerating useful quinones from quinone epoxides, and other processes for regenerating useful quinones from certain other of these degradation compounds.

According to the present invention there is provided a process for the regeneration of useful quinone compounds in a working solution degraded in use in a cyclic process for the production of hydrogen peroxide comprising subjecting the degraded working solution to a combination of at least two different regeneration treatments, each treatment comprising contact with a regeneration agent.

According to one feature of the invention there is provided a process wherein one treatment comprises contacting oxidised working solution with a regeneration agent, and another treatment comprises contacting at least partially reduced working solution with a regeneration agent.

According to a further feature of the invention there is provided a process wherein the combination comprises treatments with at least two regeneration agents, differing in at least one significant characteristic. It is to be understood that the combination does not include treating working solution twice in the same state, e.g. oxidised, with the same regeneration agent.

Suitably the regeneration agent may be a solid or a liquid regeneration agent. Particularly suitably the solid regeneration agent is selected from the group consisting of alkaline-reacting agents alkali metal aluminosilicates (especially sodium aluminosilicates), activated alumina, alkaline earth metal hydroxides and oxides, and base exchanged ion exchangers which generally speaking have an alkalinity which may be expressed as up to about 5% w/w of sodium hydroxide, and non-alkaline-reacting agents such as a non-alkaline activated alumina.

Where the working solution is treated either in the reduced or oxidised state with two or more solid regeneration agents a bed comprising layers of different agents may be used.

Suitably the liquid regeneration agent may be an aqueous alkali metal hydroxide solution, such as aqueous sodium hydroxide.

In especially preferred embodiments in at least one treatment the regeneration agent is an activated alumina, preferably a non-alkaline alumina available from Laporte Industries Limited under the Trade Name "ACTAL".

Where the combination comprises treatments with two regeneration agents differing in at least one significant characteristic, such a characteristic may be alkalinity, i.e. one alkaline reacting and the other non-alkaline; or chemical, e.g. one alumina and the other alkali metal aluminosilicate; or physical, i.e. one solid agent and the other liquid.

In certain embodiments the combination comprises both a change in state of the working solution and also use of at least two regeneration agents which differ in a significant characteristic, such as using one agent, e.g. activated alumina, on reduced solution and another agent, e.g. aqueous sodium hydroxide, on oxidised solution.

Working solutions containing substantial quantities of degradation products comprising anthraquinone epoxides are particularly amenable to treatment according to the present invention.

The process according to the present invention is particularly suitable for treating degraded working solutions resulting from continuous operation of a cyclic process employing a working solution comprising initially 2-ethylanthraquinone dissolved in a mixture of "AROMASOL" and "SEXTATE".

The process of the present invention is suitably conducted on a bleed or bleeds of the working solution from the cyclic process for the production of hydrogen peroxide such that 5 – 15% based on the total volume of the working solution is treated each cycle. Where two different regeneration treatments are both conducted on either the oxidised or reduced working solution a single bleed of working solution may be subjected to successive treatments, or divided into portions, the portions being treated in parallel. When the combination of treatments includes use of both oxidised and reduced working solution, a single bleed may be treated successively, a change in state of the working solution between treatments being affected by oxidation with air or by hydrogenation, whichever is appropriate, but preferably the combination employs at least two bleeds, including one of oxidised and one of reduced working solution.

Each treatment with solid agent may be carried out by contacting the degraded working solution with a bed of the solid regeneration agent at any temperature from ambient temperatures to the boiling point of the solvent system and preferably at from 80° to 165°C. Generally speaking, the higher the temperature, the higher is the rate of regeneration. The quantity of regeneration agent used is not critical. Where continuous treatment methods are used the bed of regeneration agent should be of suitable dimensions to give a contact time adequate to give the required degree of regeneration; for example 0.2 – 5.0% preferably 1 to 2% by weight based on the total working solution, can provide a bed of suitable dimensions. In some circumstances it may be preferred to provide different contact times for different treatments — for example by using a longer contact time such as twice as long for treatment of oxidised working solutions than for treatment of reduced working solutions. Where batch treatments are used it is convenient to use about 5 to 25% based on the weight of the working solution being treated.

Each treatment with liquid agent should be carried out by mixing thoroughly the agent with the degraded working solution at any temperature up to about 60°C where an easily saponifiable ester forms part of the working solution, or up to about 140°C where difficultly saponifiable esters are employed. Suitable amounts of agent are from about 0.1% to 1% by weight of agent based on the amount of working solution being treated. A suitable period of treatment is about 10 – 15 minutes at a temperature of 60°C employing about 0.5% by weight of sodium hydroxide dissolved in water. Generally speaking lengthening the period of contact of the regeneration agent with the working solution results in the regeneration approaching asymptotically a maximum.

Where treatment of reduced working solution is to be carried out, either the partially reduced working solution resulting from the hydrogenation stage of a cyclic process for the production of hydrogen peroxide is treated or, alternatively, such partially reduced, or even the oxidised working solution may be reduced after removal from the cyclic process for the production of hydrogen peroxide. In each case the treatment according to the present process is preferably carried out in the absence of an oxidising gas.

An alternative way of carrying out the present invention is to pass alternately working solution in the oxidised and reduced states through a single bed of the regeneration agent or agents. The periods of time during which each solution is passed through the bed may be varied in order to maximise the regeneration. Thus the periods may be the same, for example three days, or preferably, the period of time of treating reduced working solution may be several times that of treating oxidised working solutions — such as a week to 10 days on reduced and about three days on oxidised.

It is believed that when reduced working solutions are treated quinone compounds are regenerated from substantially only quinone epoxides, whereas when oxidised working solutions are treated, useful quinone compounds may be regenerated from quinone epoxides, although possibly at a slower rate, and also from other quinone degradation products.

Particular embodiments of the present invention will now be described more fully by way of example only.

Examples 1, 2, 5, 8 and 9 are according to the invention. Examples 3, 4, 6, 7 and 10 are inserted for purposes of comparison only.

EXAMPLE 1

In Example 1 the working solution, which was used, had been recovered from a cyclic process for the production of hydrogen peroxide and contained

| | |
|---|---|
| 2-ethyl anthraquinone | 54 g/l |
| tetrahydroethyl anthraquinone | 52 g/l |
| quinone degradation products | 137 g/l (17 g/l were anthraquinone epoxides) |
| methyl cyclohexylacetate/ "AROMASOL" 47%/53% v/v solvent system | |

The total potentiometric acidity of the solution was 17.5 m.eq./l

In the example 250 mls working solution were heated at 140°C with 50 g regeneration agent for 2 hours with agitation provided by a nitrogen sparge system. A water cooled condenser was used to prevent loss of solvent by evaporation. The working solution was then filtered from the regeneration agent and analysed. Second stage treatment was conducted in a similar manner using fresh regeneration agent and the filtered treated working solution from the first stage treatment. When reduced working solution was treated it was obtained by reducing the oxidised form of the working solution immediately before treatment to an extent of 50% theoretical hydrogenation of the quinone content of the working solution. The regeneration agent used was an activated alumina capable of giving an aqueous slurry, containing 100 g/l of the alumina, having a pH of 6.8, and sold by Laporte Industries Limited under the Trade Name ACTAL.

The degree of regeneration achieved was measured as follows. The following factors were determined analytically using standard polarographic techniques.

Total solids in working solution before treatment = $TS_i$

Total solids in working solution after treatment = $TS_f$

Quinone concentration before treatment = $Q_i$
Quinone concentration after treatment = $Q_f$
The factors are applied to the equation.

$$\% TR_1 = \frac{Q_f(TS_i/TS_f) - Q_i}{TS_i - Q_i} \times 100$$

$TR_1$ being the total regeneration achieved.

The % $TR_2$ for the second stage is calculated as above but expressed as a percentage of the first stage regeneration.

The result of the example is summarised in the following Table I.

Table I

| Example No. | 1st Treatment | | 2nd Treatment | |
|---|---|---|---|---|
| | Solution Condition | % $TR_1$ Regeneration | Solution Condition | % $TR_2$ Regeneration |
| 1 | Reduced | 8.0 | Oxidised | 65.0 |

A very good second stage regeneration is obtainable according to this invention, as may be seen from the example.

EXAMPLE 2

In Example 2 the working solution used and the method of treatment were the same as those described in Example 1. The regeneration agents used were a synthetic sodium aluminium silicate containing a small quantity of absorbed base known by the Trade Name DOUCIL and an activated alumina known by the Trade Name ACTAL.

The degree of regeneration achieved was measured as in Example 1.

The result is summarised in Table II.

Table II

| Example No. | 1st Treatment | | | 2nd Treatment | | |
|---|---|---|---|---|---|---|
| | Regeneration Agent. | Solution Condition. | % $TR_1$ Regeneration. | Regeneration Agent. | Solution Condition | % $TR_2$ |
| 2 | ACTAL | Reduced | 8.0 | DOUCIL | Oxidised | 92.4 |

A very good second stage regeneration is obtainable according to this invention, as may be seen from the example.

EXAMPLES 3 TO 8

In Examples 3 to 8 the working solution to be treated had been employed in a cyclic process for the production of hydrogen peroxide and contained

| | |
|---|---|
| 2-ethyl anthraquinone | 95 g/l |
| 2-tetrahydroethyl anthraquinone Anthraquinone epoxides | 14 g/l |
| Other degradation products | 103 g/l |

In each treatment, 1 litre of working solution was maintained at 140°C for 2 hours with 200 g of regeneration agent, under mechanical agitation and a nitrogen atmosphere. A water cooled condenser was provided to prevent loss of solvent by evaporation. The second treatment was conducted using a fresh sample of regeneration agent. Reduced working solutions were obtained by reducing the oxidised form under a non-oxidative atmosphere, to an extent of 50% of the theoretical maximum.

Anthraquinone epoxide concentration was measured using a standard polarographic technique, and the % epoxide removed was calculated using the equation $$\text{Epoxide removed} = \frac{E_i - E_f(TS_i - TS_f)}{E_i} \times 100\%$$

where $E_i$ and $E_f$ are respectively epoxide concentration before and after treatment.

The results are summarised in Table III.

Table III

| Example No. | Regeneration Agent | Treatment 1st | Treatment 2nd | % Epoxide Removed |
|---|---|---|---|---|
| 3 | ACTAL | Red. | Red. | 70 |
| 4 | " | Ox. | Ox. | 71 |
| 5 | " | Ox. | Red. | 80 |
| 6 | DOUCIL | Red. | Red. | 58 |
| 7 | " | Ox. | Ox. | 57 |
| 8 | " | Ox. | Red. | 71 |

EXAMPLES 9 AND 10

In Examples 9 and 10 the working solution employed and the method of treatment were the same as those described in Examples 3 to 8. The working solution had an initial acidity of 13.6 m.eq./1 (milleequivalents/litre) which fell during the treatment to 2.0 and 0.5 m.eq./1 respectively.

The quinone regeneration shown allows for change in the total solids content of the working solution.

The results are summarised in Table IV.

Table IV

| Example No. | Agent | Treatment 1st | Treatment 2nd | % Quinone Regeneration |
|---|---|---|---|---|
| 9 | Actal | Ox. | Red. | 19.6 |
| 10 | " | Red. | Red. | 9.3 |

It can be seen that in Example 9 more quinones were regenerated than the amount of quinone epoxides present initially in solution.

We claim:

1. In a process for the regeneration of useful quinone compounds in a working solution degraded during use in a cyclic process for the production of hydrogen peroxide, wherein said working solution is alternately hydrogenated to provide a reduced working solution, said oxidized to provide an oxidized working solution, said working solution containing at least some useful quinone or quinol compounds, quinone epoxides and other quinone degradation products, wherein a regeneration treatment consists essentially of bringing into contact with said working solution a solid regeneration agent selected from alkali metal aluminosilicates, activated alumina, alkaline earth metal hydroxides and oxides, base exchanged in exchangers and non-alkaline activated alumina or liquid regeneration agent selected from aqueous alkali metal hydroxide solution for a period of from 1 minute to 20 hours at a temperature of from ambient temperature to the temperature at which said working solution boils, an improvement consisting essentially of subjecting said working solution to a combination of at least two different regeneration treatments wherein one treatment said working solution is said reduced working solution and in the other treatment said working solution is said oxidized working solution.

2. A process as claimed in claim 1 wherein said regeneration agent in said treatment is a non-alkaline activated alumina.

3. A process as claimed in claim 1 wherein said combination consists of contacting a single bed of regeneration agent alternately with said oxidized working solution and said reduced working solution.

* * * * *